(12) United States Patent
Flaswinkel et al.

(10) Patent No.: US 12,510,123 B2
(45) Date of Patent: Dec. 30, 2025

(54) COUPLING FOR WIND TURBINE GEARBOX, DRIVE TRAIN, WIND TURBINE AND INDUSTRIAL APPLICATION

(71) Applicant: Flender GmbH, Bocholt (DE)

(72) Inventors: Daniel Flaswinkel, Bocholt (DE); Andre Jansen, Borken (DE)

(73) Assignee: Flender GmbH, Bocholt (DE)

( * ) Notice: Subject to any disclaimer, the term of this patent is extended or adjusted under 35 U.S.C. 154(b) by 296 days.

(21) Appl. No.: 18/022,070

(22) PCT Filed: Aug. 27, 2021

(86) PCT No.: PCT/EP2021/073715
§ 371 (c)(1),
(2) Date: Feb. 17, 2023

(87) PCT Pub. No.: WO2022/043484
PCT Pub. Date: Mar. 3, 2022

(65) Prior Publication Data
US 2023/0366437 A1    Nov. 16, 2023

(30) Foreign Application Priority Data
Aug. 28, 2020    (EP) ..................... 20193252

(51) Int. Cl.
*F16D 3/72*    (2006.01)
*F16D 3/78*    (2006.01)

(52) U.S. Cl.
CPC ................ *F16D 3/72* (2013.01); *F16D 3/78* (2013.01); *Y02E 10/72* (2013.01)

(58) Field of Classification Search
CPC .............. F16D 3/72; F16D 3/78; Y02E 10/72

USPC .................. 464/88, 95, 99; 290/55
See application file for complete search history.

(56) References Cited

U.S. PATENT DOCUMENTS

| 2,049,273 | A | * | 7/1936 | Pott ..................... B25B 21/026 |
| | | | | 464/88 |
| 2,238,380 | A | | 4/1941 | Almen |
| 3,124,342 | A | | 3/1964 | Ormond |
| 9,570,946 | B2 | * | 2/2017 | Winkler .................. H02K 5/04 |

(Continued)

FOREIGN PATENT DOCUMENTS

| CN | 207554616 U | 6/2018 |
| CN | 108930776 A | 12/2018 |
| DE | 296 23 369 U1 | 5/1998 |

(Continued)

OTHER PUBLICATIONS

International Search Report issued on Nov. 16, 2021 by the European Patent Office In International Application PCT/EP2021/073715.

(Continued)

*Primary Examiner* — Greg Binda
(74) *Attorney, Agent, or Firm* — Henry M. Feiereisen LLC

(57) ABSTRACT

A coupling for attaching a transmission to a drive shaft includes a circumferential intermediate piece including a drive-side flange, an output-side flange which is axially connected fixedly to the drive-side flange, and longitudinal webs connecting the drive-side flange to the output-side flange and configured in one piece with the drive-side flange and with the output-side flange. Each longitudinal web is configured in one piece or in two pieces.

26 Claims, 4 Drawing Sheets

(56) References Cited

U.S. PATENT DOCUMENTS

2017/0286572 A1    10/2017    Hershey et al.

FOREIGN PATENT DOCUMENTS

| DE | 10 2005 047 305 A1 | 4/2007 | |
|---|---|---|---|
| EP | 3 719 335 A1 | 10/2020 | |
| FR | 1.260.083 A * | 3/1961 | ............ 464/88 |
| JP | 2010-65724 | 3/2010 | |
| WO | WO 2012/052022 A1 | 4/2012 | |

OTHER PUBLICATIONS

Anonymous: "List of finite element software packages—Wikipedia" Aug. 12, 2020, pp. 1-9.
Chinese Search Report issued on Sep. 26, 2025 by the Chinese Patent Office in Chinese Patent Application No. 2021800533790.
Translation of Chinese Search Report issued on Sep. 26, 2025 by the Chinese Patent Office in Chinese Patent Application No. 2021800533790.

* cited by examiner

COUPLING FOR WIND TURBINE GEARBOX, DRIVE TRAIN, WIND TURBINE AND INDUSTRIAL APPLICATION

CROSS-REFERENCES TO RELATED APPLICATIONS

This application is the U.S. National Stage of International Application No. PCT/EP2021/073716 filed Aug. 27, 2021, which designated the United States and has been published as International Publication No. WO 2022/043484 A1 and which claims the priority of European Patent Application, Serial No. 20193252.2, filed Aug. 28, 2020, pursuant to 35 U.S.C. 119(a)-(d).

BACKGROUND OF THE INVENTION

The invention relates to a coupling which is suitable for mechanical attachment of a wind power transmission. The invention likewise relates to a drive train which can be used in a wind power plant. Moreover, the invention relates to a wind power plant which has a drive train of this type, and to a corresponding industrial application.

WO 2012/052022 A1 has disclosed a transmission for a wind power plant, which transmission is connected to a generator. The transmission is configured as a planetary transmission and is connected on the drive side via a main shaft to a rotor. A coupling which can be configured in different designs is provided for the connection of the main shaft to the transmission.

JP 2010 065724 A has disclosed a rigid coupling between two shafts, in the case of which rigid coupling the respective shaft is screwed via an associated shaft flange to in each case one separately configured flange, the flanges in turn being screwed to a separately configured intermediate piece. The intermediate piece has partially tubular pockets which are open radially toward the outside. Part of the pockets is closed on the end side in the axial direction, in order to realize the screw connection of the intermediate piece to the flanges there. The remaining pockets are open in the axial direction, in order to make the screw connection of the flanges to the respectively associated shaft flange possible.

DE 10 2005 047305 A1 has disclosed connecting two hubs in each case via multiple disk assemblies to an associated flange, the flanges being coupled to one another in terms of rotation via a spline toothing system such that they can be moved relative to one another in the axial direction.

DE 296 23 369 U1 has disclosed a cone bolt connection for a multiple disk assembly shaft coupling.

In various fields of mechanical engineering, there is a requirement for couplings which make a reliable transmission of torque between rotating components possible and in the process permit compensation for inaccuracies in positioning and/or orientation, A simple assembly capability, maintenance capability and high economic efficiency are likewise striven for. This applies, in particular, to wind power plant technology and industrial applications, in which high drive torques are frequently to be transported. The invention is based on the object of providing a coupling which provides an improvement in at least one of the outlined requirements.

SUMMARY OF THE INVENTION

The addressed object is achieved by way of a coupling as set forth hereinafter. Preferred refinements are specified in the subclaims and the following description, which preferred refinements can represent one aspect of the invention in each case individually or in combination. If a feature is shown in combination with another feature, this serves only for the simplified summary of the invention and is not intended in any way to mean that this feature cannot be a development of the invention even without the other feature.

The coupling is configured such that it is suitable for attaching a transmission to a drive shaft. The coupling comprises a circumferential intermediate piece which can have, in particular, a circumferential, substantially tubular main body. The intermediate piece has a drive-side flange and an output-side flange which, in particular, can adjoin the main body of the intermediate piece. In the mounted state, an introduction and discharge of drive torque into and from the coupling takes place via the drive-side and the output-side flange, respectively. To this end, the flanges can be releasably connected directly or indirectly to the drive shaft and the transmission.

The output-side flange is axially connected fixedly in terms of movement to the drive-side flange via longitudinal webs, An axial relative movement of the output-side flange with respect to the drive-side flange can be prevented by way of the longitudinal webs. The longitudinal webs belong, in particular, to pockets which are configured by the intermediate piece, it being possible for longitudinal webs which preferably follow one another in the circumferential direction to delimit a pocket, configured between these longitudinal webs, in the tangential direction or in the circumferential direction. On its two sides which point substantially in the tangential direction, the respective longitudinal web can particularly preferably delimit in each case one side of different pockets which follow one another in the circumferential direction. The pocket can be delimited in the radial direction by the main body of the intermediate piece. The main body can have, in particular, a ring which is closed in a tubular manner in the circumferential direction and can configure a base side for all the pockets. As a result, it is possible that the longitudinal webs which are arranged in a spoke-like manner and the tubular main body together with the flanges can form a multiplicity of pockets which are arranged behind one another in the circumferential direction.

The flanges are, in particular, of substantially circumferential configuration. The drive-side flange and/or the output-side flange can have, in particular, a constant external diameter. That is to say, the external diameter of the flange is substantially of identical size at every circumferential angle. The drive-side flange and/or the output-side flange are/is preferably configured as a circular disk or a circular ring. The flanges are, in particular, of flat and/or planar configuration on their axial sides. The external diameter of the flange is preferably multiple times larger than its material thickness in the axial direction along the main rotational axis of the coupling.

The longitudinal webs extend substantially in an axial direction. Here, the axial direction is parallel to a main rotational axis of the coupling. The longitudinal webs can also have an extent in the radial direction, in particular in order to delimit the pocket. The longitudinal webs can have a material thickness in the tangential direction, which material thickness is smaller than the extent of the longitudinal web in the axial direction and in the radial direction. The longitudinal webs can be oriented completely in the axial direction, or can have an oblique position in the manner of a helical toothing system, with the result that the substantially radial extent of the longitudinal web can be oblique, in particular, by a few degrees of angle with respect to the radial direction and/or axial direction. The longitudinal webs can be configured so as to point substantially radially to the outside.

In addition, the respective longitudinal web is configured in one piece with the drive-side flange and with the output-side flange. The longitudinal webs can be configured in one piece with the main body of the intermediate piece, in particular in order to configure a jointless transition of the longitudinal webs with a base side, delimiting the pocket in the radial direction, of the main body. As a result, the intermediate piece can be produced, for example, as a cast part and can accordingly be produced in a cost-efficient manner. In particular, a satisfactory demolding capability can be achieved.

The respective longitudinal web is configured in one piece or in two pieces. If the longitudinal web is configured in one piece, the drive-side flange, the output-side flange, the longitudinal webs and the main body which is possibly provided to configure a base side of the pocket can be combined in one piece inexpensively in a single one-part intermediate piece. If the longitudinal webs are configured in two pieces, it is possible for the longitudinal webs and the main body which is possibly provided to configure a base side of the pocket to be split substantially centrally in the axial direction and for a central dividing plane to be provided for the intermediate piece. The respective part of the intermediate piece which is then configured in two pieces can be of symmetrical, in particular mirror-inverted, preferably identical, configuration with respect to the other part. As a result, the respective part of the intermediate piece can be configured inexpensively as a cast part with a demolding direction which corresponds to the axial direction and the main rotational axis in the mounted state. As a result, the intermediate piece can be produced particularly inexpensively and simply. The two parts of the intermediate piece can be held together and fastened axially immovably with respect to one another in the axial direction by way of suitable fastening means.

An increase in the torsional rigidity of the intermediate piece is achieved in a weight-saving way by the longitudinal webs. The weight saving which is achieved in this way in turn facilitates mounting of the coupling according to the invention. The coupling is also suitable for being arranged between different components than a drive shaft and a transmission. The technical advantages of the coupling according to the invention can therefore also be utilized in further applications.

It is provided, in particular, that the longitudinal web or a drive-side part of the longitudinal web merges on a drive-side flange side, pointing toward the output-side flange, of the drive-side flange via rounded transitional portions which run in the circumferential direction into the drive-side flange, and/or the longitudinal web or an output-side part of the longitudinal web merges on an output-side flange side, pointing toward the drive-side flange, of the output-side flange via rounded transitional portions which run in the circumferential direction into the output-side flange. The rounded transitional portions facilitate a load distribution and a force or torque profile between the respective longitudinal web and the associated flange. As a result, the stability and strength are improved, and stress concentration effects are avoided or at least reduced. At the same time, the respective rounded transitional portion facilitates demolding of the intermediate piece after a casting process. The respective rounded transitional portion is preferably a rounded continuation of a draft angle which is provided on the longitudinal web and/or the flange which is attached in one piece. The rounded transitional portion can merge, in particular, in a continuously differentiable manner into the draft angle virtually without a step and free from edges.

The longitudinal web preferably merges radially on the outside substantially without a step into the drive-side flange and/or into the output-side flange. A radial offset between a radially outer shell surface of the flange and a radially outwardly pointing web surface can be avoided. The radially outer shell surface of the flange and the radially outwardly pointing web surface can be provided on a common radius with respect to the main rotational axis. As a result, the stability and strength are improved, and stress concentration effects are avoided or at least reduced.

In one embodiment of the claimed coupling, open pockets are formed by way of the circumferential main body of the intermediate piece, the drive-side flange, the output-side flange and longitudinal webs, the open pockets being opened in a radially outer direction in relation to the main rotational axis of the coupling. The pockets provide an increased torsional rigidity and at the same time avoid material accumulations in a radially outer region. As a result, rotating inertia of the coupling is in turn reduced in comparison with a solid overall design. The pockets also permit simplified mounting, since fastening means or tools are prevented from falling into the interior of the coupling. As a result, the mounting of the claimed coupling is also simplified. In addition or as an alternative, the pockets can also be of radially inwardly open configuration. The pockets have, for example, a U-shaped or H-shaped cross section. In particular, the respective pocket is of straight configuration in the radial direction at least in one part region as a result of the longitudinal webs which follow one another in the circumferential direction. A partially circular cross section for the pocket is avoided, with the result that, in the case of a small spacing in the circumferential direction, the longitudinal webs do not impair positioning of the base surface of the pocket on a small radius with respect to the main rotational axis. In the case of a low mass moment of inertia of the intermediate piece, a particularly high torsional rigidity can be achieved by way of a high number of longitudinal webs.

Furthermore, the drive-side flange and/or the output-side flange can be connected in each case to a multiple disk assembly. The use of at least one multiple disk assembly provides a compensation capability in the coupling, in order to compensate for a radial offset, an axial offset and/or angular offset, that is to say an oblique position, between a drive side and an output side of the coupling. In particular, in the case of the use of in each case one multiple disk assembly on the drive-side flange and on the output-side flange, an increased compensation capability is achieved. The compensation capability, that is to say the maximum radial offset, axial offset and/or angular offset which can be compensated for, is defined substantially by way of the multiple disk assemblies. On account of the torsional rigidity of the intermediate piece, the latter is negligible during the determination of the compensation capability. The claimed coupling can thus be used in fields of application, in which the compensation behavior is demanded. Furthermore, multiple disk couplings are subject substantially to a tensile load in the tangential direction during operation, which also results in an increased service life of the coupling. Furthermore, in a mounted state of the coupling, the multiple disk assemblies can be removed without destruction and, as a result, can be replaced cost-efficiently in a simple way. The claimed coupling therefore simplifies the operation of an application, in which there are high mechanical loads, and its maintenance, for example in wind power plants. Moreover, the multiple disks can be configured as multiple disk segments which can be assembled to form a circumferential multiple disk assembly. Multiple disk segments of this type are described, for example, in EP 3 719 335 A1 (application number EP 19 166 941.5). The disclosure of EP 3 719 335 A1 is incorporated by reference into the present application.

Moreover, the drive-side and the output-side flange can have recesses which lie opposite one another and are configured for receiving releasable fastening means. By way of the releasable fastening means, for example, the multiple disk assemblies can be fastened in each case to the drive-side and output-side flange. Recesses of this type can be produced in a simple way by way of drilling with increased precision. In particular, the pockets can be dimensioned in such a way that the fastening means can be inserted therein and can be plugged into the drive-side and output-side flange by way of an axial movement. As a result, the mounting and therefore also the maintenance of the claimed coupling are simplified further. Moreover, the drive-side and/or output-side flange can be configured in the region of the recesses in such a way that an axial spacing between the multiple disk assembly and the drive-side and output-side flange is minimized. To this end, for example, the flange can have an increased wall thickness in the region of the recess. As a result, a free bending length of the fastening means, by way of which the multiple disk assembly is fastened to the drive-side and output-side flange, is decreased. This allows the load-bearing capability of the fastening means to be exploited further.

In a further embodiment of the claimed coupling, the drive-side and/or output-side flange can have recesses which permit handling of releasable fastening means which are connected directly to a connecting flange which is also included in each case by the claimed coupling. Here, a connecting flange is to be understood to mean a flange piece which is also connected to a multiple disk assembly. To this end, as viewed in the circumferential direction, a multiple disk assembly can be connected, for example, in an alternating manner via releasable fastening means to the intermediate piece and a connecting flange. Accordingly, the coupling can have a drive-side and/or output-side connecting flange. The drive-side connecting flange is connected directly to the rotor shaft in the mounted state, and the output-side connecting flange is connected directly to the transmission, that is to say its input shaft. The recesses in the drive-side and output-side flange allow releasable fastening means to be guided through, by way of which the corresponding connecting flange can be connected releasably to the respective multiple disk assembly. As a result, the mounting of the claimed coupling is simplified further, as a result of which, in particular, the mounting of a wind power plant is accelerated.

Furthermore, the at least one releasable fastening means, by way of which the intermediate piece is connected to the multiple disk assembly, can comprise a bolt which is of conical configuration at least in sections. The conical shape at least in sections can define an unambiguous mounting direction of the bolt and can achieve stable seating of the releasable fastening means. Moreover, it is avoided that the bolt slides through and therefore fails into a region which is difficult to access. As a result, the mounting operation is of failsafe design, and is therefore also accelerated. The recesses, in which the bolt which is conical at least in sections is received, are of corresponding configuration with respect to the latter. As an alternative or in addition, the fastening means which connect the multiple disk assemblies to the respective connecting flanges can also comprise a bolt which is conical at least in sections. Accordingly, the connecting flanges can in each case have recesses which are of corresponding configuration to the at least partially conical bolts.

Moreover, the bolt which is conical at least in sections and by way of which the intermediate piece is connected to a multiple disk assembly can be configured such that they can be mounted in an axially outer direction. To this end, the at least partially conical bolt can be introduced into a pocket and can be moved in an axially outer direction. An axially outer direction is to be understood to mean, as viewed from a middle region of the intermediate piece, a movement toward the drive side and toward the output side. As an alternative or in addition, an at least partially conical bolt, by way of which a connecting flange can be connected to the respective multiple disk assembly, can be configured such that it can be mounted in an axially inner direction. The connecting flange is arranged in the claimed coupling in each case in an axial edge region and are accessible from the outside in the axial direction. As a result, the mounting of the claimed coupling is also simplified.

As has already been outlined, the coupling can also have a drive-side connecting flange and/or an output-side connecting flange. They can be connected in each case in a torque-transmitting manner to the intermediate piece, by being connected to a multiple disk assembly. The drive-side or output-side connecting flange can have a first wall thickness in a portion which lies opposite a releasable fastening means, by way of which the corresponding multiple disk assembly is connected to the intermediate piece. Here, the first wall thickness is reduced in comparison with a second wall thickness in adjacent portions, in which a releasable fastening means is received which connect the respective connecting flange to the corresponding multiple disk assembly. As a result, a clear space is also provided in the region of the first wall thickness, which clear space simplifies mounting of fastening components such as nuts for bolts, in particular bolts which are conical at least in sections, and ensures a movement capability there. The portions with the first and second wall thickness are arranged in a circumferential and alternating manner. As a result, the maintainability of the claimed coupling is increased further.

In a further embodiment of the claimed coupling, it can have a torsional rigidity of from 1200 MNm/rad to 2200 MNm/rad, preferably of from 1500 MNm/rad to 1800 MNm/rad. Couplings with torsional rigidities of this type have a comparatively high weight in accordance with designs from the prior art, and are complicated to mount, maintain and dismantle. The claimed coupling is suitable for use in wind power plants on account of its torsional rigidity, for example in order to connect a transmission or generator transmission to a rotor shaft of the wind power plant. The claimed coupling is likewise particularly compact and has an external diameter of from 1300 mm to 2300 mm, preferably of from 1600 mm to 2000 mm.

The underlying addressed object is also achieved by way of a drive train according to the invention which is configured for use in a wind power plant. The drive train comprises a rotor shaft, by way of which a rotation of a multiple blade rotor is transmittable, a generator, a transmission and a coupling. By way of the coupling, the rotor shaft is connected in a torque-transmitting manner to the transmission. The transmission and the generator can be configured as separate components or can be configured in an integrated manner in a generator transmission. According to the invention, the coupling is configured in accordance with one of the embodiments outlined above. By way of the use of the coupling according to the invention in the drive train, the mounting and maintenance of the latter are facilitated to a particular extent.

The addressed object is likewise achieved by way of a wind power plant according to the invention. The wind power plant comprises a nacelle, on which a multiple blade rotor is arranged rotatably which is connected in a torque-transmitting manner to a rotor shaft. The rotor shaft belongs to a drive train which is configured according to the invention in accordance with one of the embodiments shown above.

Furthermore, the object described at the outset is likewise achieved by way of an industrial application according to the invention. The industrial application comprises a drive unit which is connected via a coupling in a torque-transmitting manner to an output unit, By way of the drive unit, a drive power is introduced into the coupling and is transmitted to the drive unit. The drive unit can be configured, for example, as an electric motor, an internal combustion engine or a hydraulic motor. By way of the drive unit, a drive power is provided via an output shaft, which drive power is to be transmitted to the output unit. The drive unit can be configured, for example, as a mill, a vertical mill, a sugar mill, a cement mill, a rock crusher, a conveyor belt, a pump, a roller press, a slat conveyor, a tube mill, a rotary kiln, a slewing gear, a stirring unit, a lifting apparatus, a compactor or a car crusher. To this end, the output unit has an input shaft which is connected via a coupling to the output shaft of the drive unit. According to the invention, the coupling is configured in accordance with one of the embodiments outlined above.

The addressed object which is outlined is likewise achieved by way of a computer program product according to the invention which is configured for simulating an operating behavior of a coupling. The operating behavior is understood to mean, for example, a compensation behavior, that is to say a bending behavior, of a multiple disk assembly. A kinematic system and/or a vibration characteristic of the coupling can also be simulated by means of the computer program product. The operating behavior of the coupling can be simulated as a result in a mounted state in a drive train in a wind power plant. Accordingly, the physical behavior of the coupling is modeled in the computer program product according to the invention, and the coupling can be provided with a data interface, by way of which further simulation-directed computer program products can forward input values to the computer program product according to the invention. The computer program product can likewise also be provided with a data interface for forwarding output values of the computer program product according to the invention to further simulation-directed computer program products. The computer program product can be configured as what is known as a digital twin. Digital twins of this type are disclosed, for example, in laid open specification US 2017/286572 A1. The disclosure of US 2017/286572 A1 is incorporated by reference into the present application. According to the invention, the coupling which can be simulated by way of the claimed computer program product is configured in accordance with one of the embodiments which are outlined above.

BRIEF DESCRIPTION OF THE DRAWING

In the following text, the invention will be explained in greater detail on the basis of individual embodiments in figures. The figures are to be interpreted as supplementing one another, in so far as identical designations in different figures have the same technical meaning. The features of the individual embodiments can also be combined among one another. Furthermore, the embodiments which are shown in the figures can be combined with the features which are outlined above. In the figures, in detail.

DETAILED DESCRIPTION OF PREFERRED EMBODIMENTS

Figure 1:
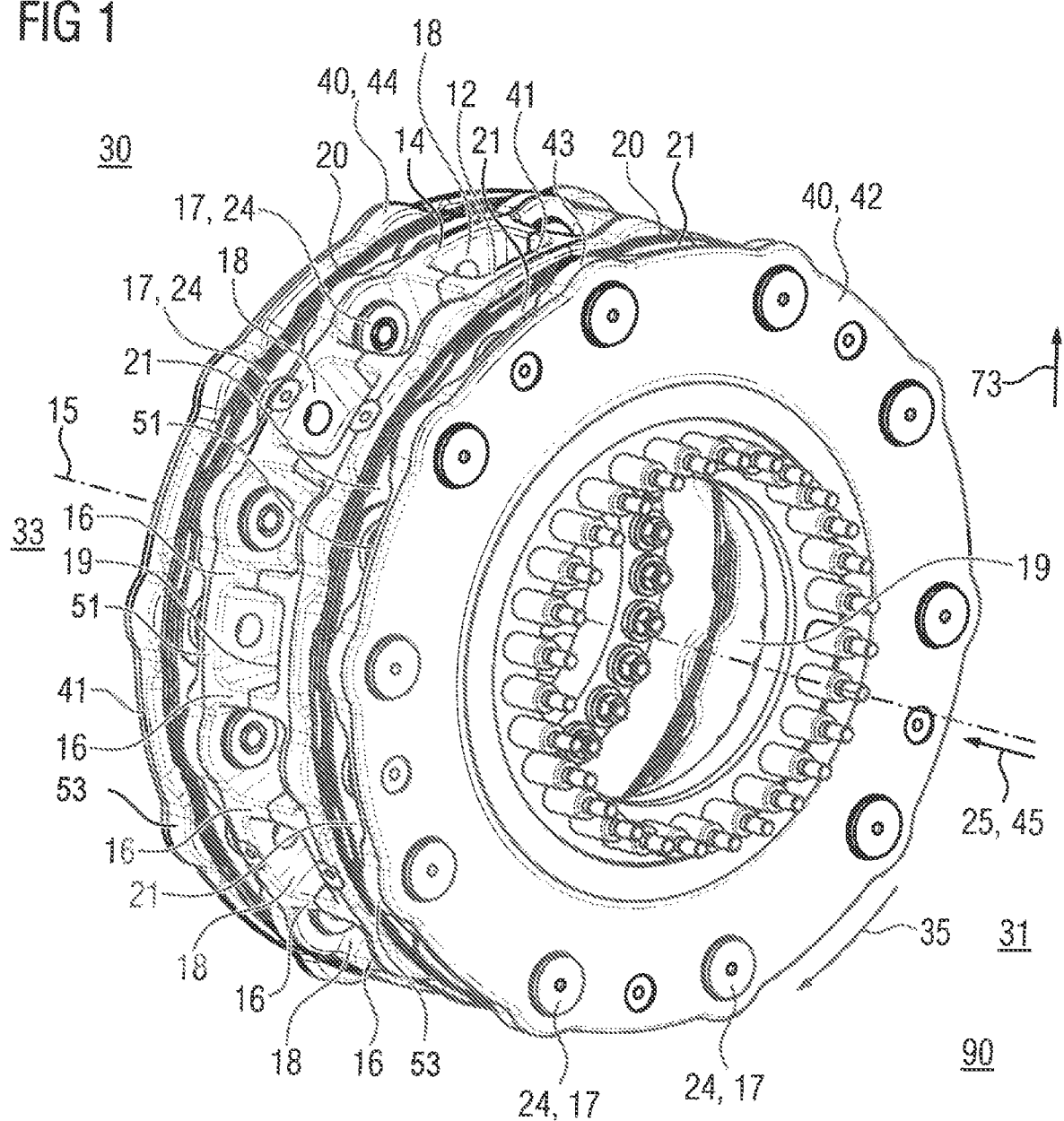
FIG. 1 diagrammatically shows one embodiment of the claimed coupling in an oblique view.

FIG. 1 diagrammatically shows one embodiment of the claimed coupling 30 in an oblique view. The coupling 30 comprises two multiple disk assemblies 20 which are fastened releasably to an intermediate piece 10 on both sides, that is to say on a drive side 31 and an output side 33. A connecting flange 40 is arranged in each case on the multiple disk assemblies 20 on a drive side 31 and an output side 33. Drive power 25 is fed about a main rotational axis 15 of the coupling 30 via a drive-side connecting flange 42. The drive power 25 is discharged from the coupling 30, furthermore, via an output-side connecting flange 44. The drive-side and the output-side connecting flange 42, 44 are likewise connected releasably in each case to a multiple disk assembly 20. The intermediate piece 20 comprises a circumferential main body 19 which is of substantially tubular configuration. The main body 19 is configured in one piece with a drive-side flange 12 and an output-side flange 14 which are also in each case of circumferential configuration. The drive-side and the output-side flange 12, 14 of the intermediate piece 10 in each case have recesses 17 which are configured for receiving releasable fastening means 24, Via the fastening means 24 in the recesses 17 in the drive-side and output-side flange 12, 14, the latter are connected releasably to the respective multiple disk assembly 20.

Longitudinal webs 16 which are of substantially rib-shaped configuration are also molded in one piece on the circumferential main body 19 of the intermediate piece 10. The longitudinal webs 16 extend substantially parallel to the main rotational axis 15 and in each case establish a load-transmitting connection between the drive-side flange 12 and the output-side flange 14. As a result, a plurality of pockets 18 are configured in each case between two longitudinal webs 16, the drive-side flange 12, the output-side flange 14 and the circumferential main body 19. Accordingly, the pockets 18 are arranged circumferentially on the intermediate piece 10. The longitudinal webs 16 represent a reinforcement against torsional loading of the intermediate piece 10. As a result of the pockets 18, the intermediate piece 10 is relatively light and at the same time rigid against torsional loads between the drive-side and the output-side flange 12, 14. The fastening means 24 which are to be mounted for releasable fastening to one of the multiple disk assemblies 20 can be inserted into the pockets 18 in a radial direction 37 and can be mounted substantially by way of an axial movement, that is to say along the main rotational axis 15. Falling into the interior of the intermediate piece 10 which is difficult to access is thus avoided. Mounting of the coupling 30 is simplified and accelerated as a result. Furthermore, the drive-side and the output-side flange 12, 14 have a first wall thickness 41 in a region which is free from fastening means 24, and have a second wall thickness 43 in a region with a releasable fastening means 24. Here, the first wall thickness 41 is smaller than the second wall thickness 43. The second wall thickness 43 therefore provides a rigid receiving means for a fastening means 24 which establishes a releasable connection between the intermediate piece 10 and one of the multiple disk assemblies 20. The higher the second wall thickness 43, the greater the load-bearing capability of the drive-side and output-side flange 12, 14 in this region, for receiving the load which is brought about by virtue of the fact that drive power 25 which acts on the intermediate piece 10 is converted into a tensile load in the respective multiple disk assembly 20. Those regions of the drive-side and output-side flange 12, 14 which are free from releasable fastening means 24 are of weight-saving configuration as a result of the first wall thickness 41. As a result of the alternating arrangement of regions with the first and the second wall thickness 41, 43 on the drive-side and output-side flange 12, 14 of the intermediate piece 10, the latter is configured in a manner which is suitable for the load, which permits a higher material utilization.

In a manner which corresponds to the drive-side and output-side flange 12, 14 of the intermediate piece 10, the drive-side connecting flange 42 and the output-side connecting flange 44 are also configured with regions which have a first and a second wall thickness 51, 53 in an alternating manner. The drive-side and output-side connecting flange 42, 44 are configured in each case with recesses 17 for receiving releasable fastening means 24. Via the fastening means 24 which are received in the drive-side and output-side connecting flange 42, 44, the latter are connected in each case to one of the multiple disk assemblies 20. The releasable fastening means 24 which are received in the connecting flanges 42, 44 and in the flanges 12, 14 of the intermediate piece 10 are arranged so as to alternate circumferentially, which results in a load distribution which is suitable for the load for the multiple disk assemblies 20. A circulating direction is illustrated in FIG. 1 by the arrow 35. Regions of the connecting flanges 42, 44 with a first wall thickness 51 are arranged opposite regions of a flange 12, 14 of the intermediate piece 10 which have the second wall thickness 43. In a corresponding manner, regions of the connecting flanges 42, 44 with the second wall thickness 53 are arranged opposite regions of a flange 12, 14 of the intermediate piece 10 which have the first wall thickness 41. In an analogous manner with respect to the intermediate piece 10, releasable fastening means 24 are thus received in the connecting flanges 42, 44 in a stable manner in regions with the second wall thickness 53, and the regions in between are configured in a weight-saving manner by way of the first wall thickness 41. Furthermore, a clear space 21 is provided by way of the first wall thickness 51 on the intermediate piece 10 and in a corresponding manner on the drive-side and output-side flange 42, 44, which clear space 21 is suitable for receiving a mounting tool (not shown). In addition to the weight saving, the first wall thickness 41 on the flanges 12, 14 of the intermediate piece 10 and the drive-side and output-side connecting flange 42, 44 provides a clear space 21 which further simplifies the mounting of the coupling 30.

Figure 2:
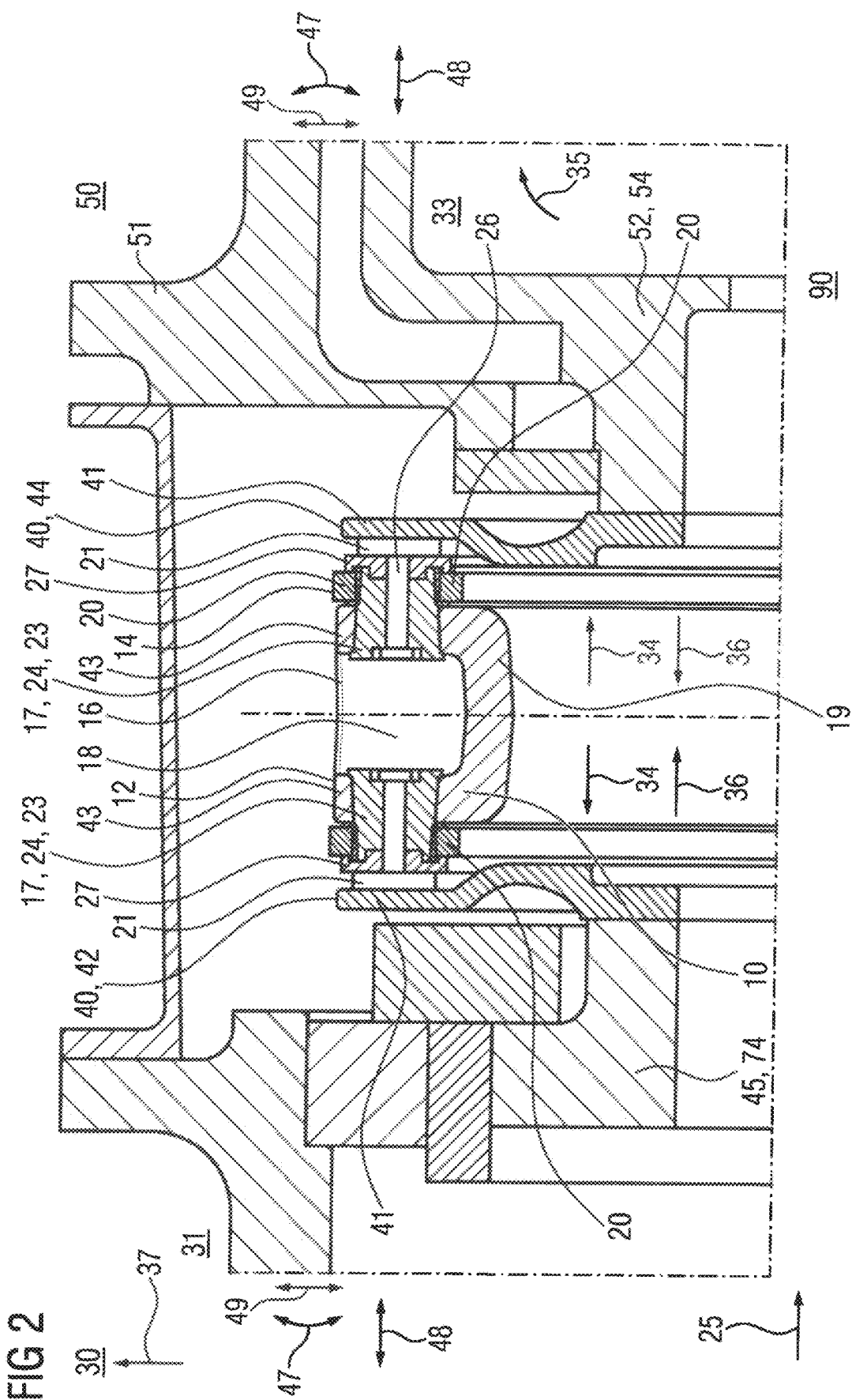
FIG. 2 shows the embodiment of the claimed coupling in an oblique view in a first longitudinal section.

The embodiment according to FIG. 1 is shown in FIG. 2 in a detailed view in longitudinal section. In FIG. 2, the coupling 30 which is shown is connected to a rotor shaft 74 which serves as a drive shaft 45, via which drive power 35 can be fed to the coupling 30 on a drive side 31. On an output side 33, the coupling 30 is connected to a hub 54 which belongs to a transmission 50, in particular a planetary transmission, and serves as an input shaft 52 in the transmission 50. The coupling 30 is configured by way of the multiple disk assemblies 20 to compensate for an angular offset 47 between the drive-side connecting flange 42 and the output-side connecting flange 44. Here, the angular offset 47 is to be understood to be substantially a tilting movement substantially along the curved double arrow 47 which is outlined in FIG. 2. The coupling 30 is likewise suitable as a result of the multiple disk assemblies 20 to compensate for an axial offset 48 and/or a radial offset 49. It can be seen in the longitudinal section according to FIG. 2 that the releasable fastening means 24 which establish a connection between a drive-side and output-side flange 12, 14 of the intermediate piece 10 and the respective multiple disk assembly 20 comprise in each case a bolt 23 which is of conical configuration at least in sections. The conical shape at least in sections of the bolts 23 leads to it being possible for the bolts 23 to be mounted only in an axially outer direction 34. The recesses 17, in which the bolts 23 are received, are also of conical configuration at least in sections in a corresponding manner with respect to the respective bolt 23. The axially outer direction 34 and correspondingly an axially inner direction 36 relate substantially to a middle region of a longitudinal web 16 or a pocket 18 on the intermediate piece 10, During mounting of the fastening means 24, in particular of the bolt 24, the pocket 18 avoids them falling into the interior of the coupling 30. Furthermore, the pocket 18 is configured to receive a tool (not shown in greater detail), by way of which a screw 26 can be tightened or released. The bolts 23 are hollow and are configured to receive at least one screw 26 which can be connected to a counterpiece 27. The corresponding multiple disk assembly 20 can be clamped to the intermediate piece 10, that is to say its drive-side and output-side flange 12, 14, by way of the respective screw 26 being tightened. Exact and load-bearing seating of the fastening means 24 is achieved by way of the conical shape at least in sections of the respective bolts 23. A clear space 21 is configured in each case by way of regions with the first wall thickness 41 by virtue of the fact that a first and second wall thickness 41, 43 are configured in an alternating manner in the circumferential direction 35 on the connecting flanges 40, 42, 44, as can also be seen in FIG. 1. The counterpiece 27 which is to be considered to belong to the respective fastening means 24 can be mounted in a simple way as a result of the clear space 21 which is provided in this way. Furthermore, the coupling 30 is modeled in a computer program product 90 which is configured to simulate an operating behavior of the coupling 30. The operating behavior of the coupling 30 includes, inter alia, a temporal profile of the transmitted drive power 25 and/or the angular offset 47, the axial offset 48 and/or the radial offset 49 which occurs/occur.

Figure 3:
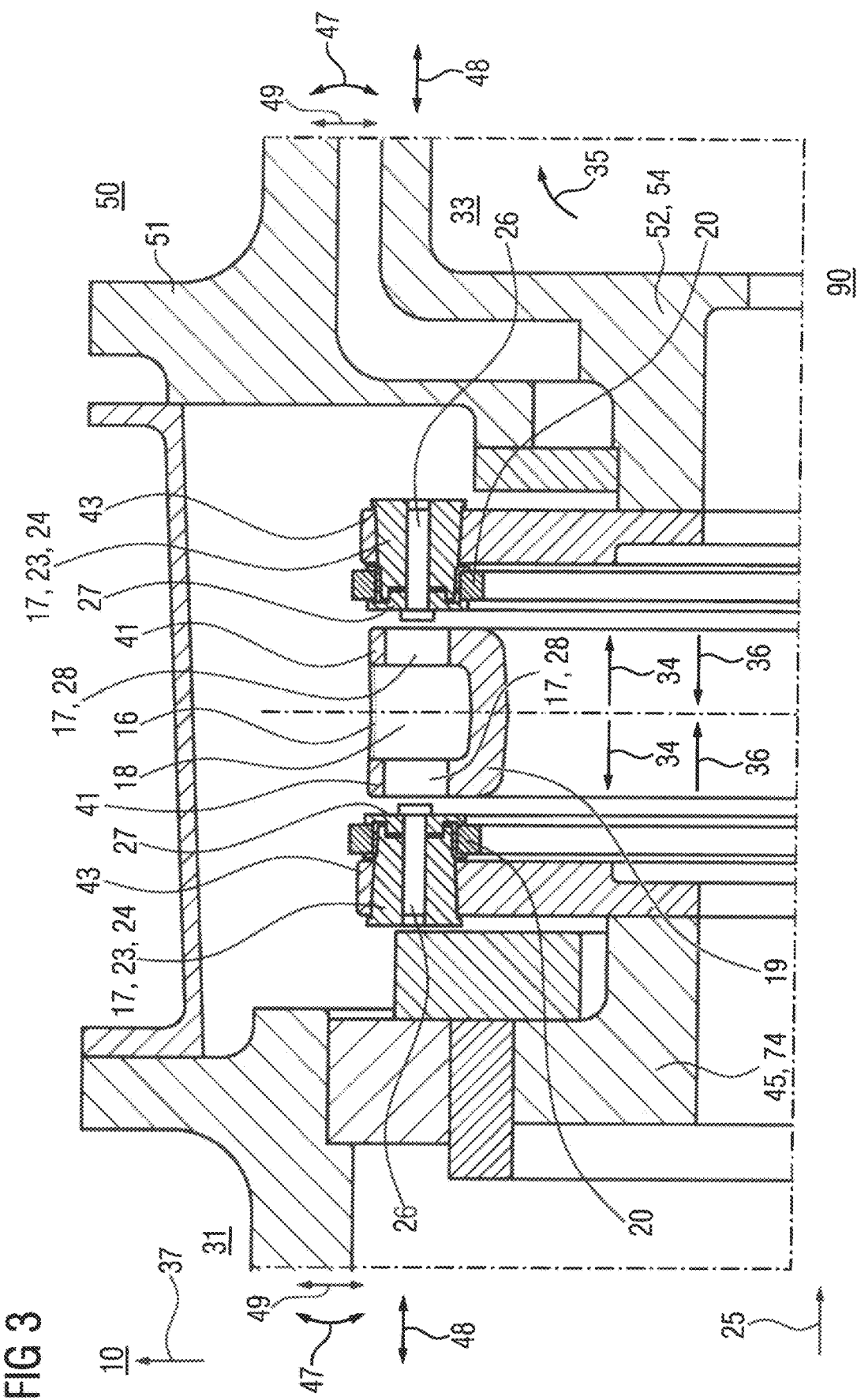
FIG. 3 shows the first embodiment of the claimed coupling in an oblique view in a second longitudinal section, FIG. 4 diagrammatically shows the construction of one embodiment of the claimed wind power plant, and FIG. 5 diagramatically shows the construction of one embodiment of the claimed industrial application.

The embodiment of the claimed coupling 30 from FIG. 1 and FIG. 2 is shown in FIG. 3 in a detailed view in a longitudinal section. Here, FIG. 3 differs from FIG. 2 in terms of the position of the sectional plane which produces the longitudinal section. FIG. 3 shows that the drive-side connecting flange 42 and the output-side connecting flange 44 also in each case via recesses 17 which are configured to receive bolts 23 of conical configuration at least in sections. To this end, the recesses are of corresponding configuration with respect to the bolts 23 which are conical at least in sections. The bolts 23 and the recesses 17 in the drive-side and output-side connecting flange 42, 44 are configured such that the fastening means 24, in particular the respective bolt 23, can be mounted in an axially inner direction 36. In the region of the fastening means 24 which establish a releasable connection between the drive-side and output-side connecting flange 42, 44 and the respective multiple disk assembly 20, the corresponding drive-side and output-side flange 12, 14 of the intermediate piece 10 has a first wall thickness 41 which is smaller than a second wall thickness 43. Accordingly, a clear space 21 is configured between a region with the first wall thickness 51 on the drive-side and output-side connecting flange 42, 44 and the respective multiple disk assembly 20, which clear space 21 permits simple mounting of a counterpiece 27 to a screw 26 which is screwed into a bolt 23 in an axially outer direction 34. Recesses 17 which serve as plug-through openings 28 are configured on the intermediate piece 10 on the drive-side and output-side flange 12, 14. The recesses 17 are configured in regions of the drive-side and output-side flange 12, 14 which have the first wall thickness 41. Screws 26 can be received for mounting purposes in each case in pockets 18 on the intermediate piece 10, and can be guided through the recesses 17, serving as a plug-through opening 28, and can be received in the corresponding bolt 23. As a result, in each case one counterpiece 27 can be clamped against the corresponding bolt 23, with the result that the corresponding multiple disk assembly 20 can be fastened to the drive-side and output-side connecting flange 42, 44 by way of the counterpiece 27. As a result, simple and rapid mounting of the coupling 30 is also ensured.

Figure 4:
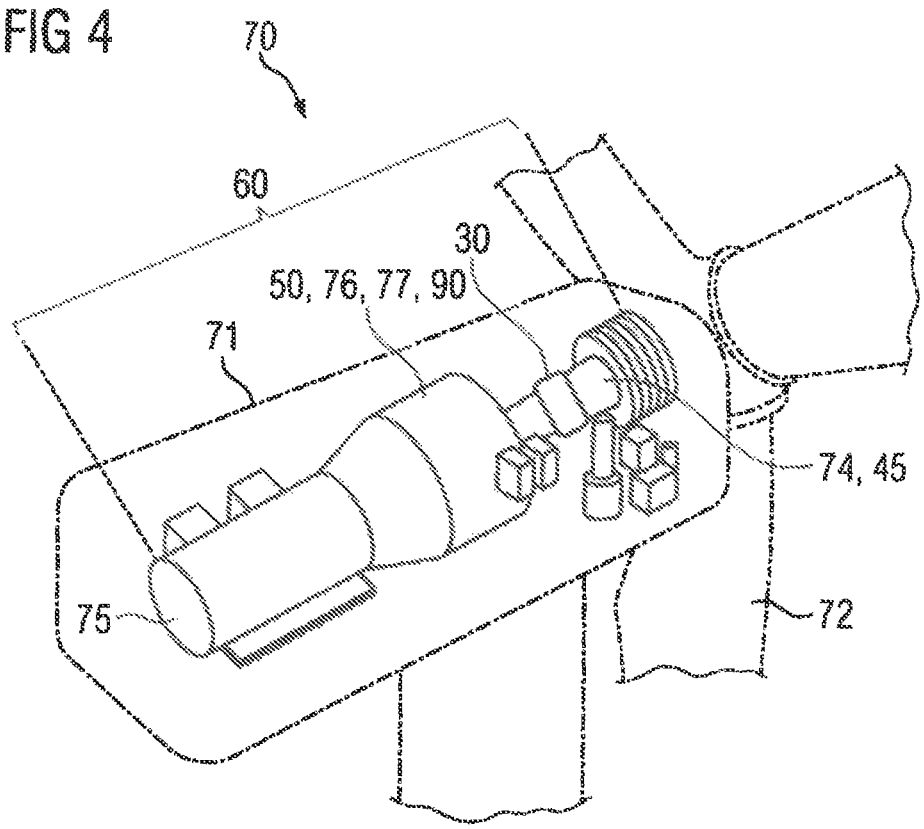
Figure 5:
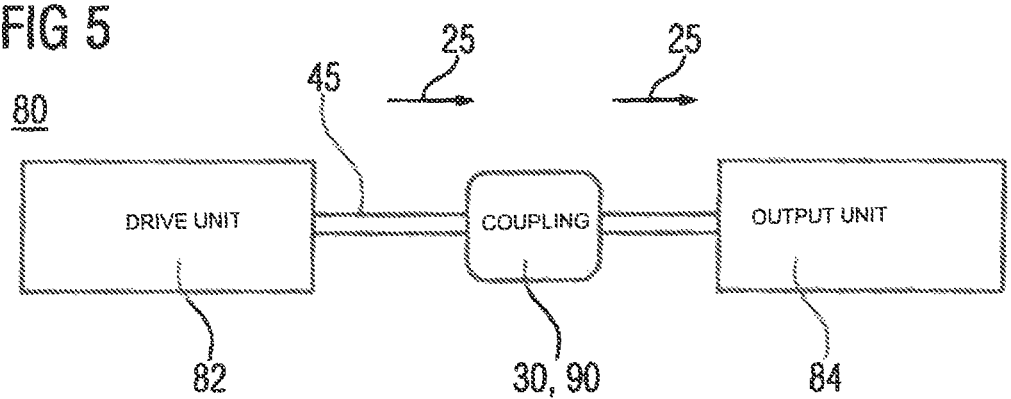

FIG. 4 diagrammatically shows the construction of one embodiment of the claimed wind power plant 70. The wind power plant 70 comprises a nacelle 71, on which a multiple blade rotor 72 is arranged rotatably. The multiple blade rotor 72 is connected in a torque-transmitting manner to a rotor shaft 74 which serves as input shaft 45 for a coupling 30. The coupling 30 is in turn connected in a torque-transmitting manner to a transmission 50 which is configured as a planetary transmission 76. The transmission 50 in turn is connected in a torque-transmitting manner to a generator 75, the transmission 50 and the generator 75 being of integrated configuration and together forming a generator transmission 77. The generator transmission 77, the coupling 30 and the rotor shaft 74 together form one embodiment of the claimed drive train 60. The coupling 30 is configured in the claimed wind power plant 70 in accordance with one of the embodiments which are outlined above. The operating behavior of the coupling 30 can be simulated by means of one embodiment of the claimed computer program product 90, in which the coupling 30 is modeled, FIG. 5 diagrammatically shows the construction of one embodiment of the claimed industrial application 80. The industrial application 80 comprises a drive unit 82, by way of which drive power 25 is provided via a drive shaft 45. The drive unit 82 is connected by way of a coupling 30 in a torque-transmitting manner to an output unit 84, by way of which a mechanical application is implemented. According to the invention, the coupling 30 is configured in accordance with one of the above-described embodiments. The operating behavior of the coupling 30 can also be simulated in the industrial application 80 by means of a computer program product 90, in which the coupling 30 is modeled.

The invention claimed is:

1. A coupling for attaching a transmission to a drive shaft, the coupling comprising:
   a circumferential intermediate piece including a circumferential main body and a drive-side flange;
   an output-side flange which is axially connected fixedly to the drive-side flange:
   longitudinal webs connecting the drive-side flange to the output-side flange and configured in one piece with the drive-side flange and with the output-side flange, each said longitudinal web being configured in one piece or in two pieces, and
   a multiple disk assembly connected to at least one of the drive-side flange and the output-side flange,
   wherein the circumferential main body, the drive-side flange, the output-side flange and the longitudinal webs form pockets which are open in a radially outer direction.

2. The coupling of claim 1, further comprising a drive-side connecting flange and an output-side connecting flange, at least one of the drive-side connecting flange and the output-side connecting flange being connected in a torque-transmitting manner to the intermediate piece.

3. The coupling of claim 2, wherein at least one of the drive-side connecting flange and the output-side connecting flange has portions which alternate circumferentially with a first wall thickness and a second wall thickness, with the first wall thickness being smaller than the second wall thickness.

4. The coupling of claim 1, wherein the torsional webs provide a torsional rigidity of from 1200 MNm/rad to 2200 MNm/rad.

5. The coupling of claim 1, wherein the torsional webs provide a torsional rigidity of from 1500 MNm/rad to 1800 MNm/rad.

6. A drive train for a wind power plant, the drive train comprising:
   a rotor shaft;
   a generator;
   a transmission connected to the generator; and
   a coupling configured to connect the rotor shaft in a torque-transmitting manner to the transmission, said coupling configured as set forth in claim 1.

7. A wind power plant, comprising:
   a drive train comprising
   a rotor shaft,
   a generator,
   a transmission connected to the generator, and
   a coupling configured to connect the rotor shaft in a torque-transmitting manner to the transmission, said coupling configured as set forth in claim 1;
   a nacelle; and
   a multiple blade rotor arranged rotatably on the nacelle and connected in a torque-transmitting manner to the rotor shaft of the drive train.

8. An industrial application, comprising:
   a drive unit;
   an output unit; and
   a coupling connecting the drive unit and the output unit to one another in a torque-transmitting manner, said coupling being configured as set forth in claim 1.

9. A coupling for attaching a transmission to a drive shaft, the coupling comprising:
   a circumferential intermediate piece including a drive-side flange, an output-side flange which is axially connected fixedly to the drive-side flange, and longitudinal webs connecting the drive-side flange to the output-side flange and configured in one piece with the drive-side flange and with the output-side flange, each said longitudinal web being configured in one piece or in two pieces;
   a multiple disk assembly; and releasable fasteners comprising bolts which have at least one conical section matching the conical shape at least in sections of respective conical recesses provided in the drive-side flange and the output-side flange and located opposite one another, with screws passing through the bolts in the radial direction and fastened to a counterpiece, thereby connecting the multiple disk assembly to the drive-side flange and output-side flange.

10. The coupling of claim 9, wherein the bolt is mountable in an axially outer direction.

11. The coupling of claim 9, further comprising a drive-side connecting flange and an output-side connecting flange, at least one of the drive-side connecting flange and the output-side connecting flange being connected in a torque-transmitting manner to the intermediate piece.

12. The coupling of claim 11, wherein at least one of the drive-side connecting flange and the output-side connecting flange has portions which alternate circumferentially with a first wall thickness and a second wall thickness, with the first wall thickness being smaller than the second wall thickness.

13. The coupling of claim 9, wherein the longitudinal webs provide a torsional rigidity of from 1200 MNm/rad to 2200 MNm/rad.

14. The coupling of claim 9, wherein the torsional webs provide a torsional rigidity of from 1500 MNm/rad to 1800 MNm/rad.

15. A drive train for a wind power plant, the drive train comprising:
a rotor shaft;
a generator;
a transmission connected to the generator; and
a coupling configured to connect the rotor shaft in a torque-transmitting manner to the transmission, said coupling configured as set forth in claim 9.

16. A wind power plant, comprising:
a drive train comprising
a rotor shaft,
a generator,
a transmission connected to the generator, and
a coupling configured to connect the rotor shaft in a torque-transmitting manner to the transmission, said coupling configured as set forth in claim 9;
a nacelle; and
a multiple blade rotor arranged rotatably on the nacelle and connected in a torque-transmitting manner to the rotor shaft of the drive train.

17. An industrial application, comprising:
a drive unit;
an output unit; and
a coupling connecting the drive unit and the output unit to one another in a torque-transmitting manner, said coupling being configured as set forth in claim 9.

18. A coupling for attaching a transmission to a drive shaft, the coupling comprising:
a circumferential intermediate piece including a drive-side flange, an output-side flange which is axially connected fixedly to the drive-side flange, and longitudinal webs connecting the drive-side flange to the output-side flange and configured in one piece with the drive-side flange and with the output-side flange, each said longitudinal web being configured in one piece or in two pieces;
a drive-side connecting flange:
an output-side connecting flange, and
a multiple disk assembly connected to at least one of the drive-side flange and the output-side flange,
wherein at least one of the drive-side connecting flange and the output-side connecting flange is connected in a torque-transmitting manner to the circumferential intermediate piece, and
wherein at least one of the drive-side connecting flange and the output-side connecting flange has portions which alternate circumferentially with a first wall thickness and a second wall thickness, with the first wall thickness being smaller than the second wall thickness.

19. The coupling of claim 18, wherein the drive-side flange and the output-side flange have recesses which lie opposite one another for receiving releasable fasteners.

20. The coupling of claim 19, wherein at least one of the fasteners comprises a bolt which has at least one conical section.

21. The coupling of claim 20, wherein the bolt is mountable in an axially outward-facing direction.

22. The coupling of claim 18, wherein the longitudinal web provides a torsional rigidity of from 1200 MNm/rad to 2200 MNm/rad.

23. The coupling of claim 18, wherein the torsional webs provide a torsional rigidity of from 1500 MNm/rad to 1800 MNm/rad.

24. A drive train for a wind power plant, the drive train comprising:
a rotor shaft;
a generator;
a transmission connected to the generator; and
a coupling configured to connect the rotor shaft in a torque-transmitting manner to the transmission, said coupling configured as set forth in claim 18.

25. A wind power plant, comprising:
a drive train comprising
a rotor shaft,
a generator,
a transmission connected to the generator, and
a coupling configured to connect the rotor shaft in a torque-transmitting manner to the transmission, said coupling configured as set forth in claim 18;
a nacelle; and
a multiple blade rotor arranged rotatably on the nacelle and connected in a torque-transmitting manner to the rotor shaft of the drive train.

26. An industrial application, comprising:
a drive unit;
an output unit; and
a coupling connecting the drive unit and the output unit to one another in a torque-transmitting manner, said coupling being configured as set forth in claim 18.

* * * * *